Oct. 17, 1961 L. G. PORKERT 3,004,493
CONTROL MECHANISM
Filed July 24, 1959 3 Sheets-Sheet 1

INVENTOR
Lloyd G. Porkert

BY *Beale and Jones*

ATTORNEYS

Oct. 17, 1961 L. G. PORKERT 3,004,493
CONTROL MECHANISM

Filed July 24, 1959 3 Sheets-Sheet 2

INVENTOR
Lloyd G. Porkert

BY Beale and Jones
ATTORNEYS

Oct. 17, 1961  L. G. PORKERT  3,004,493
CONTROL MECHANISM
Filed July 24, 1959  3 Sheets-Sheet 3

INVENTOR
Lloyd G. Porkert

BY  *Beale and Jones*
ATTORNEYS

United States Patent Office 3,004,493
Patented Oct. 17, 1961

3,004,493
CONTROL MECHANISM
Lloyd G. Porkert, 4819 Barrymore Drive, Washington 21, D.C., assignor of twenty percent to Thomas K. Hampton, Washington, D.C.
Filed July 24, 1959, Ser. No. 829,412
9 Claims. (Cl. 103—38)

This invention relates to control means for adjusting the displacement and/or timing of a rotary variable output device such as an adjustable rotary cam, and it comprises novel means to mount and move a control surface in such a way that it may be rotated and oscillated respectively about two intersecting axes at right angles to each other. In the preferred embodiment the invention provides a novel variable displacement pump which comprises the novel control means.

In adjustable rotary cams it is common to provide a cam surface which varies in its transverse contour along its axial length and to provide means for shifting the cam axially to change the displacement and/or timing of a follower engaging the cam. Adjustable cams of this type have certain inherent disadvantages. The bearings for the shaft carrying the cam must be increased in length by at least the axial length of the cam. The pressure of the follower against the axial slopes of the cam tends to displace the latter axially, requiring more force to adjust the cam to the desired axial position, and increasing the wear. Counter-balance springs and substantial power are usually necessary to operate them. If the follower is a piston or plunger, the side thrust thereon is considerable. If the cam slope is substantial, the design of the follower surface becomes difficult. Cams of this type are inherently unbalanced and it is difficult if not impracticable to balance them statically and dynamically. This makes them unsuitable for high speed operation, and even at lower speeds the life of adjustable cams of this type is comparatively short, requiring frequent overhaul and adjustment, with replacement of parts.

One object of the present invention is to overcome the above disadvantages of prior art adjustable rotary control mechanisms such as adjustable rotary cams or switches.

Another object is to provide novel control means comprising a first member which has a control surface for contacting a second member, means for rotating the first member about a first axis, and means for adjusting it about a second axis perpendicular to the first axis independently of its rotation about the first axis. Another object is to provide an improved variable displacement pump. Mechanisms made in accordance with the present invention are lighter and more durable, and they require less space than prior art devices for performing the same functions. They impose very little side thrust on the follower. They can also be operated at higher speeds, are more reliable, and are adaptable to a wider range of uses.

Other objects and advantages of the present invention will be apparent from the following description and the appended drawings, wherein.

Figure 2:
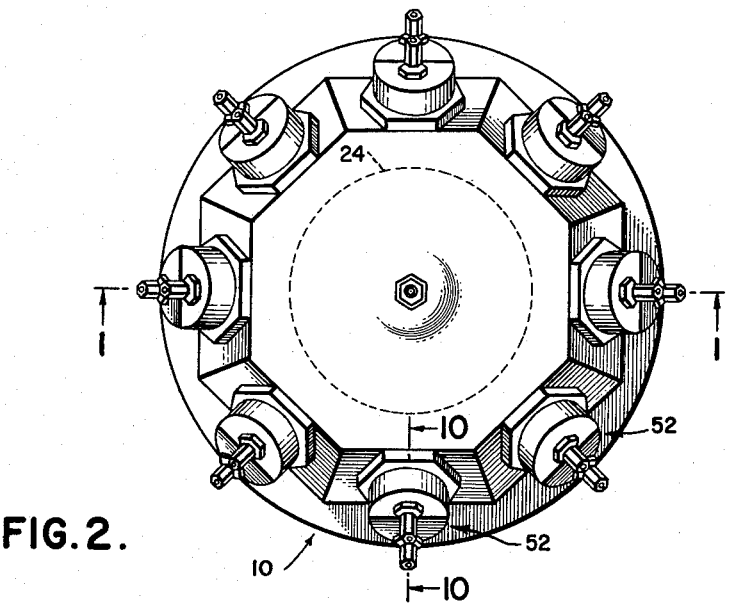
FIG. 2 is a plan view of the same.
Figure 1:
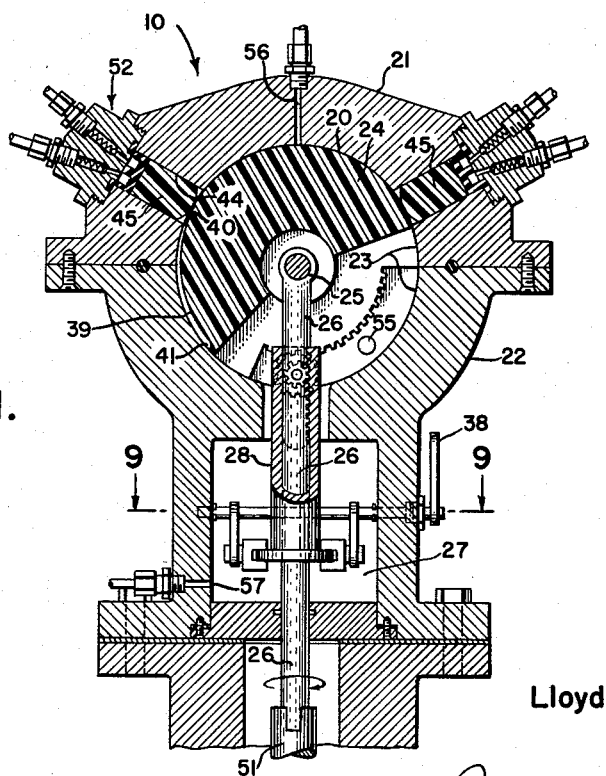
FIG. 1 is a vertical section of an improved fuel injection pump made in accordance with the present invention, taken on line 1—1 of FIG. 2.
Figure 4:
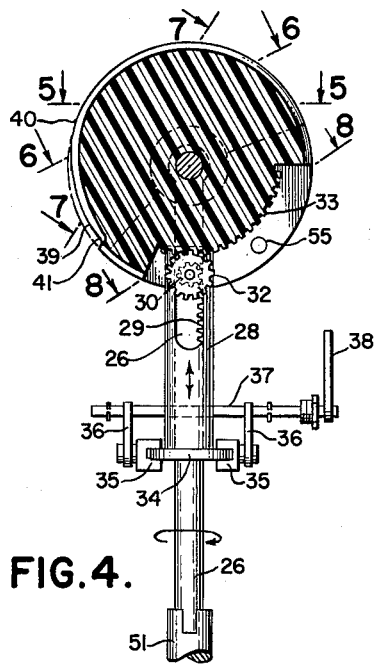
FIG. 4 is a vertical section taken on line 4—4 of FIG. 3.
Figure 3:
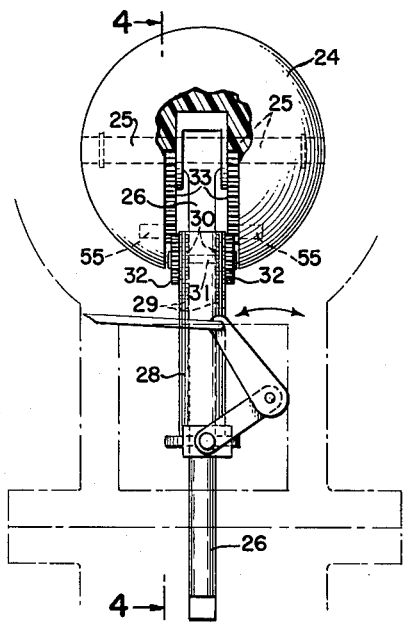
FIG. 3 is a detached view of the control mechanism shown in FIG. 1, as seen from the right of FIG. 1, portions of the supporting structure being indicated in dot and dash lines.

Referring now to the drawings wherein like characters indicate the same or similar parts, FIGS. 1 to 11 show a fuel injection pump which embodies the best means for carrying out my invention. The fuel injection pump, generally designated 10, comprises a housing formed of upper and lower members 21 and 22 formed to provide a cavity having a concave spherical surface 23 in which is mounted a control member 24, preferably formed of nylon, which has a spherical surface 20 which slidingly engages spherical surface 23, so that spherical surface 23 provides a bearing in which member 24 is free to rotate in any direction. A pivot pin 25 is mounted in member 24 with its longitudinal or pivot axis passing through the center of the spherical surfaces 20 and 23. A shaft 26 having a longitudinal axis passing through the centers of spherical surfaces 20 and 23 has its upper end pivotally mounted on pivot pin 25. Suitable means are provided for rotating shaft 26 as indicated schematically at 51 in FIG. 4. Thus, control member 24 may be rotated around the longitudinal axis of shaft 26.

A slide 28 is slidably mounted on shaft 26 for rotation therewith. It carries a pair of racks 29 which mesh with a pair of pinions 30. Pinions 30 are fixed to a shaft 31 which is mounted transversely and rotatably in shaft 26. Rigidly attached to or integral with pinions 30 are a second pair of gears 32 which mesh with the teeth of a pair of gear sectors 33 which are rigidly attached to or integral with control member 24. Slide 28 extends downwardly into the lower chamber 27 of the housing and has at its lower end an outwardly extending flange 34 which is engaged on opposite sides by a pair of slides 35 pivotally mounted on levers 36 which are rigidly secured to a shaft 37 which is rotatably mounted in the housing. Shaft 37 extends out of the housing and carries a control lever 38 rigidly secured to it. Thus, by turning control lever 38, slide 28 is moved vertically, and this through gears 29, 30, 32 and 33 turns control member 24 about the pivot axis of pivot pin 25.

Figure 5:
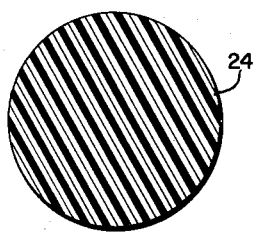
FIGS. 5 to 8 are sections taken on the section lines indicated in FIG. 4.
Figure 6:
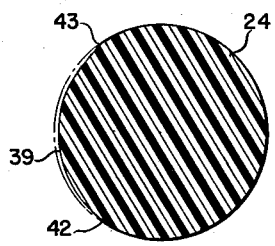
Figure 7:
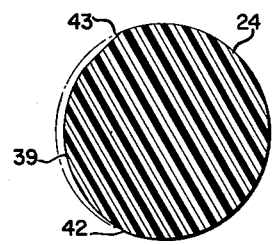
Figure 8:
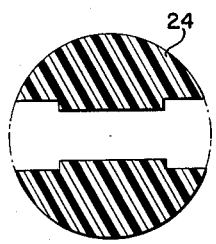
Figure 9:
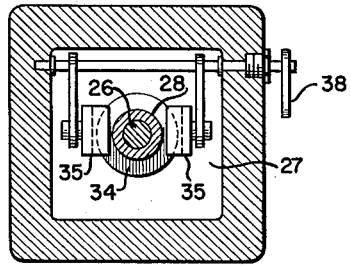
FIG. 9 is a section taken on line 9—9 of FIG. 1.
Figure 10:
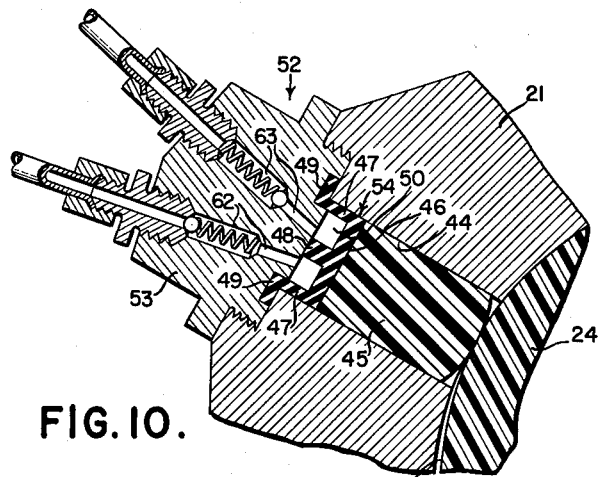
FIG. 10 is an enlarged fragmentary section taken on line 10—10 of FIG. 2.
Figure 11:
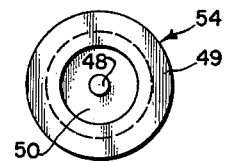
FIG. 11 is a plan view of the resilient capsule shown in FIG. 10.

Member 24 has a depressed control surface or cam surface 39 which is formed with a shape such as to give cam followers or plungers 45 the desired reciprocating cycle both as to length of stroke and as to rate of change of movement thereof, according to the rotational position of control member 24 about pivot pin 25. Surface 39 varies in depth vertically as viewed in FIG. 1 from minimum depression at 40 to maximum at 41, and transversely thereto as indicated in FIGS. 6 and 7 from an entrance point 42 to an exit point 43, the transverse width of the surface 39 being zero or a minimum value as illustrated in FIG. 5, up to a maximum, which is approximately as illustrated in FIG. 7.

For lubrication purposes, inlet and outlet channels 56 and 57 preferably are provided respectively through housing members 21 and 22.

For balancing the control member, embedded weights 55 may be provided.

In operation, control member 24 is rotated by the engine on which fuel pump 10 is installed through connection 51 and shaft 26. Independently of its rotation with shaft 26 it is rotatably adjusted about the axis of pivot pin 25 by means of the control linkage 38, 28, 33 as described above, between the idling position of minimum cam throw illustrated in FIG. 1 to full power position in which the deepest part of cam 39, i.e. that at portion 41, is brought abreast plungers or pistons 45. Thus the throw of plungers 45 and the output of pump units 52 is controlled. Each pump unit 52 may supply a separate cylinder of the engine; or the outputs of several or all of the pump units may be combined if desired.

Various types of pumping units may be used, depending upon the type of pump or service required. I prefer a resilient sealed capsule pump unit such as disclosed and claimed in my copending application filed concurrently herewith and described below in connection with FIG. 10 (pump unit 52) and FIG. 12 (pump unit 52').

In the preferred embodiment, as indicated in FIG. 2, there are eight pumping units. One of these, generally designated 52 is shown at enlarged scale in FIG. 10. For each unit 52 a cylinder 44 is provided in the housing. In each cylinder 44 a plunger or follower 45 is slidably mounted, its inner surface being curved slightly as indicated to provide a cam follower surface to engage control member 24, and its outer flat surface engaging a resilient capsule generally designated 54.

Resilient capsule 54 has a forward wall 46 engaging plunger 45, a cylindrical side wall 47, slidably engaging cylinder wall 44, and a central column 48 extending from forward wall 46 to abut cylinder head 53, which is threadedly mounted in housing 21 over cylinder 44. Capsule 54 also has a flange 49 extending outwardly from its sidewall 47 between cylinder head 53 and housing 21. Capsule 54 is made of a suitable synthetic rubber, and flange 49 is permanently bonded to metallic cylinder head 53 all around its perimeter, preferably with a suitable thermo-setting cement, such as an epoxy resin cement, to provide a fluid-tight sealed chamber 50 between capsule 54 and cylinder head 53. Thus, resilient capsule 54 provides a partially collapsible annular chamber 50 surrounding central column 48. Resilient capsule 54 biases plunger 45 against control member 24, so that annular chamber 50 expands and contracts in accordance with the contour of the cam surface 39, along the portion thereof adjustably positioned to contact plunger 45. Inlet and outlet channels 62, 63 are provided through head 53 and are connected respectively with fuel supply and discharge pipes. A spring-biased ball check valve is provided in each of the enlarged portions of channels 62 and 63. Each of these enlarged portions is provided with a ball seat at its inner end. A ball seat for the outer end of each of these enlarged portions or check valve chambers is provided on the inner end of a connector coupling which is threadedly mounted in head 53. Plungers 45 are of such a length as to slightly compress resilient capsules 54 when the plungers are at the innermost ends of their respective movements. The construction of pump units 52 with resilient capsules 54 bonded thereto, and with check valves provided in the body of head 53, is such that complete cell units 52 may be removed and replaced by like units. By providing ball seats at both ends of the check valve chambers the spring and ball in each chamber may be reversed, making the parts interchangeable.

Figure 12:
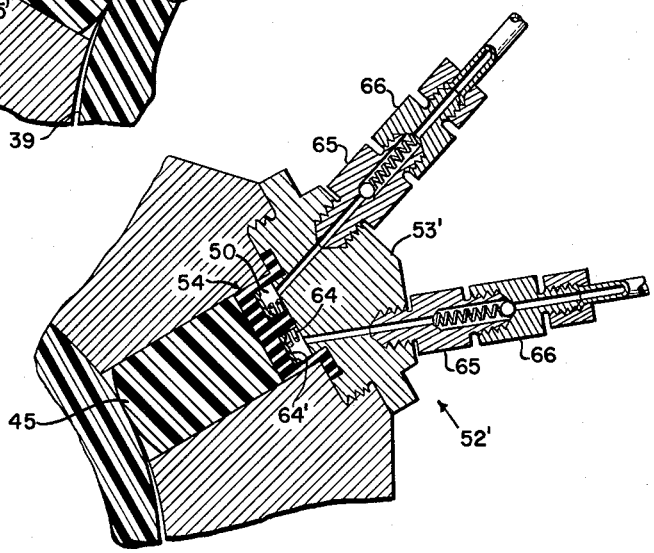
FIG. 12 is a view similar to FIG. 10, showing an alternate structure.

FIG. 12 shows an alternative construction for the pump units, designated 52', and comprising a cylinder head 53' with threadedly attached check valves, each of which has a body 65 containing the valve chamber and formed with an inner ball seat and a threadedly attached cap 66 in which is formed an outer ball seat. This construction also provides interchangeability of parts. A spring 64 is provided in annular chamber 50 to reinforce the resilient force of capsule 54 against plunger 45. A spring bearing plate 64' is provided between spring 64 and capsule 54. Otherwise, the construction is the same as that of pump unit 52 (FIG. 10), the capsule being permanently bonded to cylinder head 53' to provide a fluid-tight collapsible annular chamber 50.

Pump units 52 and 52', each comprising a cylinder head with resilient capsule bonded thereto, and with check valves formed in or attached to the cylinder head itself, provide convenient replaceable units with sealed collapsible chambers. An improved fluid-sealed resilient capsule is provided because the resilient capsule is permanently bonded to the cylinder head all around the flange 49.

Figure 13:
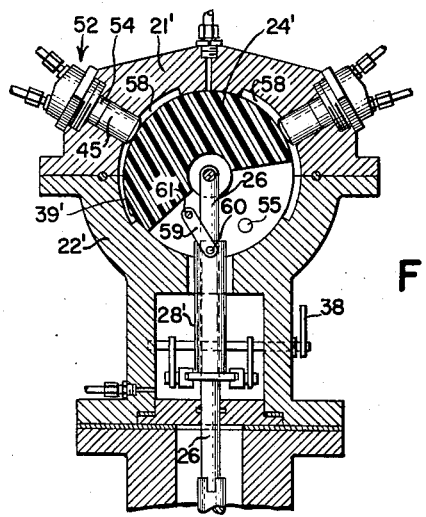
FIG. 13 is similar to FIG. 1, showing an alternate structure at smaller scale.

FIG. 13 illustrates another embodiment of my invention, utilizing a cam surface 39' which is raised above the spherical surface 24' of the control member instead of being depressed. To accommodate the raised cam surface, housing members 21' and 22' are suitably recessed as indicated at 58. An alternative means for connecting the slide and the control member is shown. Instead of the geared connection between slide 28' and control member 24' for positioning the latter, a link 59 (or a pair of links) is pivoted at one end 60 to the slide, and at the other end 61 to control member 24'. Otherwise this embodiment is the same as that of FIGS. 1–11, and it operates in the same manner.

It will be apparent that the cam surface may have both raised and depressed portions. Although I prefer to provide the control member with sufficient spherical surface for supporting it directly on the housing, this is not essential. The rod 26 upon which the control member is mounted, and which rotates the same, may be supported by two bearings, at least one of which is a thrust bearing, thus supporting the control member free from contact with the housing. With this arrangement the control member need have no spherical surfaces. Shaft 26 may extend through an arcuate slot in the top of the control member, with a bearing in the top of the housing, but a larger available area for control or cam surface is provided on the control member if both bearings are provided on the input end of shaft 26, in the manner illustrated for the adjustable switch of FIG. 14, and described below.

As various other embodiments of my invention will be obvious to those skilled in the art, the foregoing examples are to be considered as illustrative and not as limiting the scope of the appended claims.

I claim:

1. A control mechanism comprising a housing, said housing having a cavity with an axis of rotation extending therethrough, a control member mounted in said cavity, said cavity having a concave spherical support surface, said member having a convex spherical bearing surface in sliding contact with said support surface, said surfaces being concentric around a point on said axis and having sufficient coacting areas to provide a bearing to hold said member against displacement in said housing while leaving it free to rotate about said point, a control surface on said member, said member having a control axis through said point perpendicular to said axis of rotation, means for adjusting the rotational position of said member about said control axis, means for rotating said member about said axis of rotation, and a contact member mounted in said housing and engaging said control surface.

2. A control mechanism as defined by claim 1, said means for rotating said control member comprising a shaft rotatably mounted in said housing on said axis of rotation, and means on said shaft engaging said control member for rotating it around said axis of rotation.

3. A control mechanism as defined by claim 2, comprising pivot means in said control member, said pivot means having an axis identical with said control axis, said pivot means being attached to said shaft for rotation therewith.

4. A control mechanism as defined by claim 2, said means for adjusting the rotational position of said control member about said control axis comprising an adjusting member mounted on said shaft for rotation therewith, means for moving said adjusting member relative to said shaft, and a connection between said adjusting member and said control member for adjusting the latter about said control axis in response to the movement of the adjusting member relative to said shaft.

5. A control mechanism as defined by claim 1 wherein said control surface is a cam surface which varies in distance from said point, and said contact member is a cam follower engaging said control member.

6. A control mechanism as defined by claim 5 comprising in combination a pump chamber in fixed structure, said cam follower comprising a piston in said pump chamber.

7. A variable stroke pump comprising a housing having a cavity with a concave spherical surface portion, a cam having a convex spherical surface portion concentric with said concave spherical surface portion, said cam being rotatably mounted in said cavity with its convex spherical surface portion slidingly supported by the spherical surface portion of said housing against displacement of said cam bodily in any direction in said housing, a shaft mounted in said housing for rotation about its longitudinal axis, said axis passing through the radial center of said spherical surface portions, means for rotating said shaft, means on said shaft engaging said control member for rotating it around said axis, said cam having a control axis through said radial center, perpendicular to said longitudinal axis, means for adjusting the rotational position of said cam about said control axis, a cam surface on said cam, the radial distances of points on said cam surface from said radial center varying along an arc which is transverse to said control axis, a pump chamber on said housing, and a pump plunger mounted for reciprocation in said chamber and biased against said cam.

8. A pump as defined by claim 7, comprising pivot means in said cam, said pivot means having an axis identical with said control axis, said pivot means being attached to said shaft for rotation therewith.

9. A pump as defined by claim 7, said means for adjusting the rotational position of said cam about said control axis comprising an adjusting member mounted on said shaft for rotation therewith, means for moving said adjusting member relative to said shaft, and a connection between said adjusting member and said control member for adjusting the latter about said control axis in response to the movement of the adjusting member relative to said shaft.

References Cited in the file of this patent

UNITED STATES PATENTS

| | | |
|---|---|---|
| 1,012,851 | Hodgkinson | Dec. 26, 1911 |
| 1,118,799 | Prott | Nov. 24, 1914 |
| 1,971,601 | Dilg | Aug. 28, 1934 |
| 2,256,079 | Dinzl | Sept. 16, 1941 |

FOREIGN PATENTS

| | | |
|---|---|---|
| 290,348 | Germany | Feb. 23, 1916 |
| 713,778 | Germany | Nov. 15, 1941 |